United States Patent

Fujita et al.

[11] Patent Number: 5,955,131
[45] Date of Patent: Sep. 21, 1999

[54] METHOD OF SANDWICHING SOFT AND SMOOTH FLUID FOOD AS A FLAT SHAPE WITH UNIFORM THICKNESS

[75] Inventors: Yoshiyuki Fujita; Yufuji Kawasaki, both of Tokyo, Japan

[73] Assignee: Nippon Suisan Kaisha, Ltd., Tokyo, Japan

[21] Appl. No.: 08/778,660

[22] Filed: Jan. 3, 1997

[51] Int. Cl.⁶ .................................................... A21D 13/00
[52] U.S. Cl. ............................ 426/275; 426/89; 426/95; 426/438; 426/439; 426/524; 426/138
[58] Field of Search ................................. 426/89, 92, 95, 426/98, 524, 438, 439

[56] References Cited

U.S. PATENT DOCUMENTS 3,909,881  10/1975  Anderson ..................................... 17/32
4,919,946  4/1990   Pak et al. ................................... 426/89
5,073,399  12/1991  Vassiliou ..................................... 426/89
5,665,416  9/1997   Manderfeld et al. ..................... 426/89

*Primary Examiner*—Anthony J. Weier
*Attorney, Agent, or Firm*—Armstrong, Westerman, Hattori, McLeland and Naughton

[57] ABSTRACT

A method of sandwiching soft, smooth and fluid food between a top half and a bottom half of a bun includes, first, making the food with thermo-coagulable protein that solidifies due to heat is included in the food. The food is then formed into a flat shape having a uniform thickness and a size suitable for sandwiching between the top half and the bottom half of the bun. After applying a coating to the food, it is deep-fried while heating the coating to a light brown so that the food includes a smooth and fluid center portion and a film-like peripheral portion that is coagulated by the thermo-coagulable protein. The food thus deep-fried is sandwiched between the top half and the bottom half of the bun.

7 Claims, No Drawings

METHOD OF SANDWICHING SOFT AND SMOOTH FLUID FOOD AS A FLAT SHAPE WITH UNIFORM THICKNESS

FIELD OF THE INVENTION

The present invention relates to a method of sandwiching soft, smooth and fluid food having a flat shape with uniform thickness, between the top half and bottom half of a bun. More specifically, this invention is concerned with such a method of sandwiching soft, smooth and fluid food having a flat shape with uniform thickness, which method is characterized by deep-frying the soft, smooth and fluid food to form a light brown coating on the food due to the deep-frying, so as to produce the food having a smooth and fluid center portion and a coagulated, thin-skin-like peripheral portion by heating it without causing a rupture.

BACKGROUND OF THE INVENTION

Conventionally well-known kinds of pre-fried food made by coating an ingredient with crumbs of bread include: seafood, such as fried oyster, fried shrimp, ring-shaped fried squid, fried saurel and fried salmon; meat, such as fried chicken, fried pork or pork cutlet, fried beef and Scotch egg; and vegetables, such as egg plant, asparagus, onion, spring onion, potato and mixed vegetables. The pre-fried food of any of these kinds consists of two layers, i.e, an ingredient and a coating layer, and is made by coating the ingredient with crumbs of bread, through a batter as a mixture of flour, egg, and milk, for example.

A kind of pre-fried food, such as croquettes containing crab meat or shrimp with creamy sauce, uses a creamy sauce in which an ingredient such as crab meat or shrimp is well dispersed. To thoroughly disperse the ingredient in the creamy sauce, these croquettes with creamy sauce are made by mixing the ingredient, which has been cut or otherwise made into small pieces, with the creamy sauce, and coating the mixture with bread crumbs. Another kind of pre-fried food, such as "fried stuffed crêpe", is known and which is made by covering an ingredient with a crêpe, coating the crêpe with bread crumbs, and deep-frying the crumbed crêpe. The above kinds of pre-fried food are commercially available, generally as cooked food or frozen food.

The above kinds of pre-fried food are deep-fried in an oil before eating, and a sauce, such as Worcester sauce, demiglace sauce, or tomato sauce, or soy sauce, salt or the like is added to the deep-fried food when eating. The croquettes with creamy sauce as described above are made by mixing an ingredient, such as cooked vegetables, crab meat or shrimp, with a creamy sauce that provides a base for the ingredient, forming the mixture into a suitable shape by cooling, coating it with bread crumbs, and deep-frying the crumbed food. The croquettes thus made are characterized in the balance between the taste of the ingredient and the taste of the creamy sauce.

The ingredients used for croquettes with creamy sauce are cut into small pieces or otherwise made small so as to be dispersed well in the creamy sauce serving as a base. In this case, the ingredient is present as it is integrated with the creamy sauce, and therefore the taste, feeling of mastication and flavor of the ingredient are different from those the ingredient originally has. Such ingredients as oyster, which look worse in appearance if they are cut into small pieces, are not used in the form of small pieces. Rather, the ingredients used for the above croquettes are limited to those that taste good when they are dispersed well in the creamy source.

When this kind of soft, smooth and fluid food is sandwiched between the top half and bottom half of a bun, not for household use but for commercial use in particular, the softness and smoothness of the food must be sacrificed in actual situations, in view of a particular problem that the food tends to rupture or bursts open during the deep-frying.

SUMMARY OF THE INVENTION

It is therefore an object of the present invention to provide a food material for commercial use that is to be sandwiched between the top half and bottom half of a bun, wherein soft, smooth and fluid food exhibits its own or inherent softness and smoothness. It is also an object of the invention to provide a food product in which the food material for commercial use is sandwiched between the top half and bottom half of the bun, wherein the food material is deep-fried while maintaining its own or inherent softness and smoothness.

A general manner of eating soft, smooth and fluid food, such as gratin or stew, together with bread is eating the food and bread separately, rather than eating the food sandwiched between two slices of bread. It is, on the other hand, possible to eat ham, vegetables and the like with one hand as they are sandwiched between two slices of bread. If such food as gratin and stew can be sandwiched between two slices of bread, one can readily eat the food as a sandwich, using only one hand. To these dishes, however, are indispensable the soft and smooth feeling of mastication peculiar to their sauces. Thus, this kind of fluid food is not considered to be of good quality as gratin or stew if the food is hard enough to maintain the original shape so that it can be sandwiched between two slices of bread. The above object may be accomplished according to the present invention, by applying a coating to soft, smooth and fluid food, such as gratin or stew and deep-frying the food so that the food can be sandwiched between two slices of bread while maintaining the soft and smooth feeling of mastication.

According to the present invention, there is provided a method of sandwiching soft, smooth and fluid food between a top half and a bottom half of a bun, comprising the steps of: cooking the food such that thermo-coagulable protein that solidifies due to heat is included in the food; forming the food into a flat shape having a uniform thickness and a size suitable for sandwiching between the top half and the bottom half of the bun; applying a coating to the food and deep-frying the food so that the food includes a smooth and fluid center portion and a film-like peripheral portion that is coagulated by the thermo-coagulable protein, while heating said coating to light brown; and sandwiching the food between the top half and the bottom half of the bun.

The above-indicate steps of forming the food into the flat shape and applying the coating to the food may consist of the step of freezing the soft, smooth and fluid food containing the thermo-coagulable protein into the flat shape having the uniform thickness and the size suitable for sandwiching between the top half and the bottom half of the bun, and the step of covering the frozen food with the coating so as to produce a food material that is to be deep-fried. The above-indicated step of applying the coating to the food may include the step of forming at least a bread crumb layer. The food material that is to be deep-fried may be frozen. The thermo-coagulable protein may consist of albumin or globulin. The soft, smooth and fluid food may be gratin or creamy stew.

DETAILED DESCRIPTION OF THE PREFERRED EMBODIMENT

There will be described soft, smooth and fluid food used in the present invention.

The present invention is applicable to any kind of soft, smooth and fluid flood having any kind of taste, either in the form of paste, or a liquid-like dish having an appropriate degree of viscosity. Typical examples of the soft, smooth and fluid food are gratin and stew. Other examples include soft, smooth and fluid dishes using western sauces, which include an anchovy sauce, tomato sauce, white sauces including a béchamel sauce and others, Worcester sauce, sauce for pork cutlet, steak sauce, barbecue sauce, and mayonnaise sauces (including tabasco sauce, chili sauce, orange sauce, cranberry sauce and tartar source), tomato ketchup, those having chocolate, butter, cheese or the like as a base, soups such as broth and consomme, creams, spreads such as mustard and liver paste. In addition, the soft, smooth and fluid food may include Japanese and Chinese dishes using soy sauce, miso, and baste. Among these kinds of fluid food, those having low viscosity are given an appropriate degree of viscosity as needed, and used to serve the above-described function.

Generally, buns are small-sized bread rolls or cakes containing yeast. While there are various kinds of buns, they are usually sweetened a little. Buns used in the present invention may be those used for making hamburgers. One will not make his/her hand(s) dirty when eating if the food is sandwiched between two slices of bread such as buns, and the bread can prevent a spill of the food to a certain degree.

While gratin is cooled and formed in a shape after it is produced, thermo-coagulable protein that solidifies due to heat is added to the gratin after cooling and before shaping. The thermo-coagulable protein is preferably added when the temperature is equal to or lower than at least the coagulating temperature. The content or amount of the protein may be in such a range in which the thermo-coagulable protein included in the food functions upon deep-frying to form a smooth, fluid center portion and a coagulated, film-like peripheral portion. More specifically, the content of the protein is in a range of 1.0 to 3.0% by weight with respect to sauce.

Effect of Thermo-coagulable Protein

While soft, smooth and fluid food is cooled after cooking, and formed into a flat shape by freezing, bubbles may enter the inside of the food during this process. Also, a network structure of starch, which is formed during cooling, is broken during the forming process. These may result in a rupture of the food if it is deep-fried after forming its shape and applying a coating to the food thus shaped. To avoid the rupture, albumin protein or globulin that is coagulable due to heat is added to the food when it is formed into a shape.

The rupture of the food upon deep-frying is prevented in the following manner.

Upon deep-frying, the thermo-coagulable protein added to the fluid food absorbs excessive water vapor and coagulates or solidifies when it is heated. As a result, the fluid food, such as a creamy sauce, is given increased ability to maintain its shape, which prevents the creamy sauce from spilling or coming out of the coating.

When this kind of soft, smooth and fluid food is sandwiched between the top half and bottom half of a bun, not for household use but for commercial use in particular, the softness and smoothness of the food must be sacrificed in actual situations, in view of the problem of the rupture of the food during deep-frying. If the fluid food of the present invention that is to be sandwiched between slices of the bun is heated from outside upon deep-frying, the thermo-coagulable protein included in the food serves to form a smooth, fluid center portion and a coagulated, film-like peripheral portion. This phenomenon appears most conspicuously when the food is a frozen food. Namely, the increase in the temperature of the center portion is considerably delayed while the peripheral portion is heated and coagulated, and the smooth and fluid feeling of mastication can be maintained unless the coating is burnt brown due to excessive heating.

In the method of the present invention, the food is formed into a flat shape having a uniform thickness and a size suitable for sandwiching between the top half and bottom half of a bun, and then rapidly frozen so that the original shape is maintained. Although a method using a mold or a method in which the food is shaped with a tube and then sliced may be employed as the forming method so as to produce a stable shape, a continuous forming and freezing method using a contact freezer is preferably employed for efficiency in mass production.

The above-indicated coating generally consists of a coating layer called "bread-crumb layer". This coating layer consists of at least a flour layer, batter layers and bread-crumb layers. Since the coating layer is applied to a frozen cream layer, a plurality of batter layers and bread-crumb layers are present in a single coating layer. The above-indicated flour layer and batter layer used in the present invention may be of any kind that is usually used for producing fried food. While bread crumbs are typically used to form the above-indicated bread-crumb layer, crackers, cornflakes, punpkinflakes, sliced almonds, fritters, sesame seed and the like may also be used.

An oil used for deep-frying may be a general vegetable oil, such as salad oil or soybean oil, or an animal fat, such as tallow (vet) or lard, or a hydrogenated oil using palm oil or the like as a material. The deep-frying temperature is preferably in a range of 175 to 185° C.

The process will be briefly explained. Initially, soft, smooth and fluid food, such as gratin or stew, is covered with a coating. In sum, the food is freezed into a flat shape having a uniform thickness and a size suitable for sandwiching between the top half and bottom half of the bun, by means of a contact freezer, for example, and then coated with batter and bread crumbs.

EXAMPLES

Examples of the present invention will be described in detail. It is, however, to be understood that the invention is by no means limited to these examples.

Example 1

Production of Gratin Croquette (1) 100 g of macaroni (its weight approximately doubles after boiling) is boiled in salted water, drained and lightly covered with oil.

(2) Shrimps are boiled and drained.

(3) 30 g of butter and oil are added to a kneader and heated. Flour is then added, and the mixture is further heated so as to make roux. Milk, water, evaporated milk and a seasoning liquid are added and boiled thoroughly. The macaroni obtained in (1), which has been boiled in salted water and lightly covered with oil, and the shrimps obtained in (2) are added, mixed and cooled, and food grade albumin powder is added, so as to make macaroni gratin.

(4) The macaroni gratin obtained in (3) is formed in shape by a molding machine, and frozen in a contact freezer.

(5) After freezing, a coating layer is formed around the macaroni gratin. The coating layer is formed by applying first batter, first bread crumbs, second batter and second bread crumbs to the frozen gratin in this order. Because it is hard for the macaroni gratin to maintain its original shape, even if a film-like peripheral portion is formed as described above, to avoid a rupture when deep-fried, a thin coating is applied twice so that the coating layer is uniformly and firmly formed around the gratin.

| Composition Chart of Gratin Croquette | | |
| --- | --- | --- |
| Composition of Final Product after Coating | | |
| Gratin | 50 g ... | (1) |
| Batter | 16 g | (first batter 6 g, second batter 10 g) |
| Bread crumbs | 13 g | (first crumbs 4 g, second crumbs 9 g) |
| Total | 79 g | |
| Composition of Gratin ... | (1) | |
| Gratin Sauce | 75% ... | (2) |
| Shrimp | 14% | boiled |
| Macaroni | 10% | boiled |
| Powder of Egg White | 1% | |
| Total | 100% | |
| Composition of Gratin Sauce ... | | (2) |
| Flour | 12% | |
| Butter | 2% | |
| Vegetable Oil | 4% | |
| Milk | 30% | |
| Salt | 0.4% | |
| Evaporated Milk | 10% | |
| Water | 25% | |
| Seasoning Liquid | 17% | |
| Total | 100.4% | |
| Others (Spice) | 0.2% | |

Example 2

Béchamel Sauce (white sauce made from milk)

This sauce is easy to cook and is a popular family recipe. It has simple taste, and can be widely used for a variety of dishes. Depending upon its thickness, this sauce may be used as a base for gratin, croquette or soup. Vegetables may be boiled in this creamy sauce or mixed with the white sauce. The Béchamel sauce is also suited for dishes using light ingredients, such as shrimp, crab meat, shell fish, chicken and eggs.

Ingredients:

Butter 1 tablespoon, flour (well-sieved) 2 tablespoons, milk 1 bottle (200 ml), a bay leaf, salt ¼ teaspoon Into these ingredients may be added veal, white meat, bacon or ham, so that the taste becomes richer or thicker when boiled. Otherwise, chopped onions, which have been sautéed, may be added.

How to Make the Béchamel Sauce

Butter is put into a thick saucepan and heated, and flour is put into the saucepan through a sieve, and cooked over low heat for 5 to 10 minutes while being stirred with a wooden spoon so as to avoid coloring (white roux). When the content that initially has a thick texture like rice-cake is gradually changed into a smooth and light texture, the saucepan is once removed from heat to dissipate the heat, and milk is added and quickly mixed in with a whisk. The saucepan is returned to the heat, and salt and bay leaf are put into the mixture, which is then boiled for 30 minutes until it thickens. The content is occasionally stirred so as not to burn the bottom. The thus obtained sauce is filtered through a cloth, and warmed again for use.

Sauce using the Béchamel sauce as a base

Mornay sauce ... Béchamel sauce 20

According to the present invention as described above, there can be provided a food material for commercial use that is to be sandwiched between the top half and bottom half of a bun, wherein soft, smooth and fluid food exhibits its own or inherent softness and smoothness. This invention also provides a food product in which the food material for commercial use is sandwiched between the top half and bottom half of the bun, wherein the food material is deep-fried while maintaining its own or inherent softness and smoothness.

What is claimed is:

1. A method of sandwiching fluid food between a top half and a bottom half of a bun, comprising the steps of:

adding thermo-coagulable protein into said food;

forming said food into a flat shape having a uniform thickness and a size for sandwiching between the top half and the bottom half of the bun;

applying a coating to said food;

deep-frying the food so that the food includes a smooth and fluid center portion and a film-like peripheral portion that is coagulated by said thermo-coagulable protein, while heating said coating to light brown; and sandwiching the food between the top half and the bottom half of the bun.

2. A method according to claim 1, wherein the step of forming said food into the flat shape comprises the step of freezing said food in said flat shape, and the step of applying the coating to said food comprises the step of covering said food in frozen state with the coating, thereby producing a coated food material.

3. A method according to claim 1, wherein the step of applying the coating to said food comprises the step of forming a bread crumb layer.

4. A method according to claim 2, further comprising the step of freezing said coated food material.

5. A method according to any one of claims 1–4, wherein said thermo-coagulable protein includes albumin.

6. A method according to any one of claims 1–4, wherein said soft, smooth and fluid food is one of gratin and cream stew.

7. A method according to claim 2, wherein the step of applying the coating to said food comprises the step of forming a bread crumb layer.

* * * * *